United States Patent [19]

Nishimura

[11] 4,320,821

[45] Mar. 23, 1982

[54] CONTROL DEVICE FOR A TORQUE CONVERTER IN AN AUTOMATIC SPEED CHANGE GEAR FOR VEHICLES

[76] Inventor: Sadanori Nishimura, 299-10, Tsuchiya, Ohmiya-shi, Saitama-ken, Japan

[21] Appl. No.: 58,676

[22] PCT Filed: Nov. 10, 1978

[86] PCT No.: PCT/JP78/00023
§ 371 Date: Jul. 18, 1979
§ 102(e) Date: Jul. 18, 1979

[87] PCT Pub. No.: WO79/00410
PCT Pub. Date: Jul. 12, 1979

[30] Foreign Application Priority Data

Dec. 20, 1977 [JP] Japan .................. 52-153873

[51] Int. Cl.³ ............... F16D 25/10; F16H 41/18
[52] U.S. Cl. ................... 192/3.31; 192/87.18;
192/103 R; 74/731; 74/336 R
[58] Field of Search ............ 192/3.25, 3.26, 3.27,
192/3.28, 3.29, 3.3, 3.31, 3.32, 3.33, 3.57, 103 R,
103 C, 87.18; 74/731, 732, 336 R, 337

[56] References Cited

U.S. PATENT DOCUMENTS

| | | | |
|---|---|---|---|
| 3,164,232 | 1/1965 | General | 192/3.27 |
| 3,416,393 | 12/1968 | Hattori | 192/731 |
| 3,542,174 | 11/1970 | Hattori | 192/3.26 |

FOREIGN PATENT DOCUMENTS

| | | | |
|---|---|---|---|
| 32-5206 | 7/1957 | Japan. | |
| 49-44987 | 4/1974 | Japan. | |
| 52-3977 | 1/1977 | Japan | 192/3.25 |
| 52-13381 | 1/1977 | Japan. | |
| 52-101359 | 8/1977 | Japan. | |
| 52-101360 | 8/1977 | Japan. | |
| 52-129889 | 10/1977 | Japan. | |
| 52-149989 | 11/1977 | Japan. | |

Primary Examiner—George H. Krizmanich
Attorney, Agent, or Firm—Armstrong, Nikaido, Marmelstein & Kobovcik

[57] ABSTRACT

A control device for a torque converter in an automatic speed change gear for vehicles having an input shaft connected to a driving shaft of the engine through a torque converter having a pump disc associated with the driving shaft and a turbine disc associated with the input shaft. Between the pump disc and the turbine disc there is interposed a hydraulically operated direct coupling clutch which is capable of directly coupling the pump and the turbine discs and wherein between an oil pressure cylinder of the direct coupling clutch and a high pressure oil passage connected to an oil pressure source and a low pressure oil passage connected to an oil reservoir there is disposed a centrifugal valve operatively connected with the turbine disc for placing the oil pressure cylinder in communication with the low pressure oil passage at the time of low speed rotation and with the high pressure oil passage at the time of high speed rotation.

2 Claims, 6 Drawing Figures

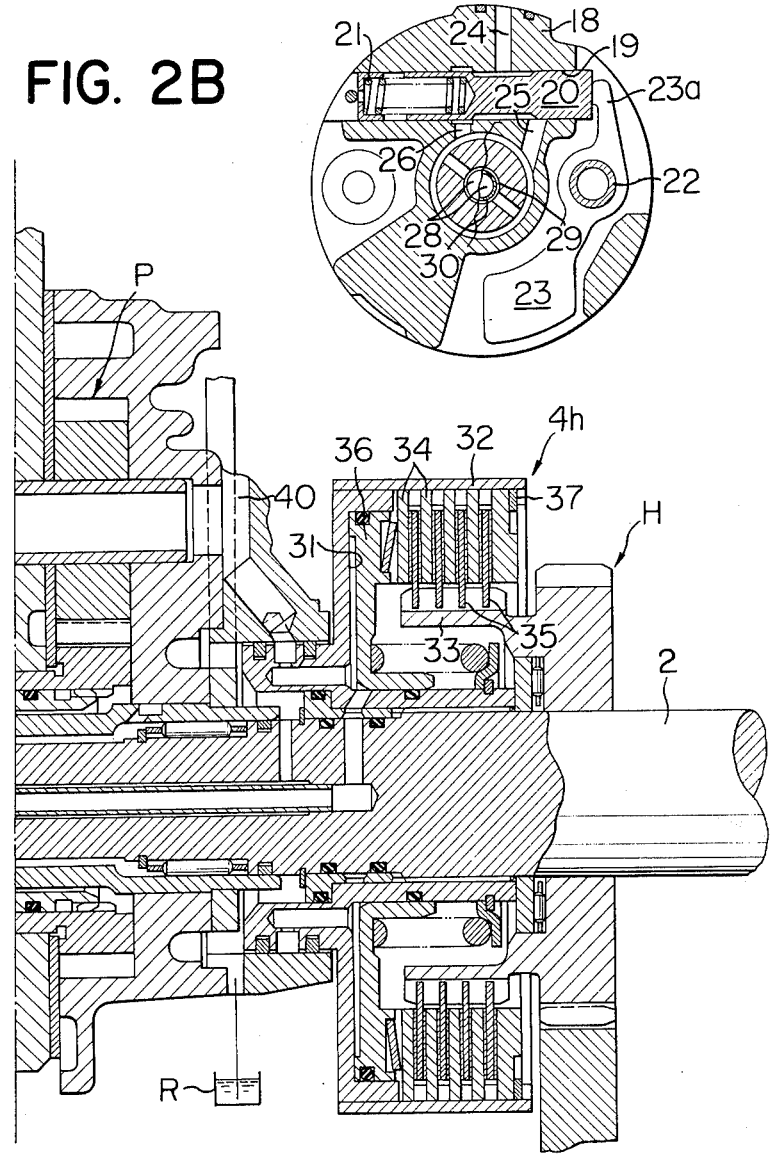

CONTROL DEVICE FOR A TORQUE CONVERTER IN AN AUTOMATIC SPEED CHANGE GEAR FOR VEHICLES

FIELD OF THE INVENTION

The present invention relates to a direct coupling control device for a torque converter in an automatic speed change gear for vehicles principally used in automobiles.

DISCLOSURE OF THE INVENTION

A primary object of the present invention is to provide an arrangement wherein a direct coupling clutch interposed between a pump disc and turbine disc which constitute a torque converter is operated when the turbine disc reaches a speed of rotation in excess of a given value so that in the clutch region where no speed changing action of the torque converter takes place, a slip loss of the torque converter may be removed by the operation of the direct coupling clutch to enhance the transmission efficiency and to improve the fuel consumption. A secondary object of the invention is to provide an arrangement wherein in case of the provision of at least two-stage (high and low) speed change geared devices, even if the rotational speed of the turbine disc reaches the aforementioned given value, the direct coupling clutch is not operated as long as the high speed geared device is kept out of operation so that particularly when the low speed geared device is in operation due to high acceleration, the torque increasing action of the torque converter is sufficiently utilized at all times so as not to impair the accelerating performance of the vehicle, and when shifting down or switching in operation from the high speed geared device to the low speed geared device is effected during running at high speeds, the direct coupling clutch acts to avoid unfavorable situations, such as dangerous excessive deceleration and excess speeding of the engine.

According to the present invention, there is provided a control device for a torque converter in an automatic speed change gear for vehicles, said automatic speed change gear having an input shaft connected to a driving shaft of an engine through a torque converter having a pump disc associated with said driving shaft and a turbine disc associated with said input shaft, wherein between said pump disc and said turbine disc there is interposed a hydraulically operated direct coupling clutch which is capable of directly coupling the pump and turbine discs, and between an oil pressure cylinder of said direct coupling clutch, a high pressure oil passage connected to an oil pressure source and a low pressure oil passage connected to an oil reservoir there is disposed a centrifugal valve operably connected with said turbine disc for placing said oil pressure cylinder in communication with said low pressure oil passage at the time of low speed rotation and with said high pressure oil passage at the time of high speed rotation.

BRIEF DESCRIPTION OF THE DRAWINGS

FIG. 2B is the other half of the same;

FIG. 3 is a sectional view taken along line III—III in FIG. 2A; and

BEST MODE OF EMBODYING THE INVENTION

Figure 1:
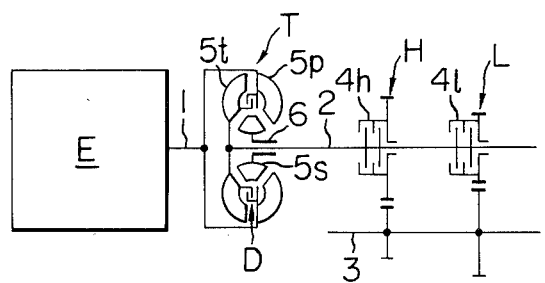
FIG. 1 is a schematic illustration of an automatic speed change gear for vehicles provided with the control device of the present invention.

In the following, one embodiment of the present invention will be described with reference to the drawings. Referring first to FIG. 1, there is shown an engine E which has a driving shaft 1 connected to an input shaft 2 of a speed change gear through a torque converter T, the input shaft 2 being in turn connected to an output shaft 3 through a low speed geared device L and a high speed geared device H. The low and high speed geared device L, H have a hydraulically operated low speed clutch 4$l$ and high speed clutch 4$h$, respectively, which are adapted to be selectively actuatable to operate the desired geared device L or H so as to change the gear ratio between the input and output shafts 2, 3.

As may be seen in detail in FIGS. 2A and 2B, the torque converter T is composed of a pump disc 5$p$ associated with the driving shaft 1 of the engine E, a turbine disc 5$t$ associated with the input shaft 2, and a stator disc 5$s$ associated with a stator shaft 6 supported on the outer periphery of the input shaft 2, and a direct coupling clutch D of the construction as described below is interposed between the pump disc 5$p$ and the turbine disc 5$t$.

Annular inner peripheral walls 8 and 9 of the pump disc 5$p$ and turbine disc 5$t$ are opposed to define a transmission oil passage 7 between both discs 5$p$ and 5$t$, and have a clutch outer part 10 and a clutch inner part 11 formed therein in concentric relation. The clutch outer part 10 and clutch inner part 11 respectively have a plurality of driving friction plates 12 and a plurality of driven friction plates 13 spline-engaged therewith for sliding movement, the plates 12, 13 being alternately superposed one over another. In the inner peripheral wall 9 of the turbine disc 5$t$ is formed an annular oil pressure cylinder 14, which receives therein a pressure piston 15 opposing one side of the superposed friction plates 12, 13, and a pressure receiving ring 16 opposing the other side of the friction plates 12, 13 is locked to the clutch inner part 11. Thus, when pressure oil is fed into the oil pressure cylinder 14, the resulting pressure causes the pressure piston 15 to advance to thereby bring, in cooperation with the pressure receiving ring 16, the friction plates 12, 13 in friction engagement with each other, that is, to place the direct coupling clutch D in an operative state whereby the pump and turbine discs 5$p$, 5$t$ may be connected directly.

The chamber between the inner peripheral walls 8 and 9 is in communication with the transmission oil passage 7 through a clearance between the inner peripheral walls so that the oil pressure within the oil passage 7 may be always exerted on the front surface of the pressure piston 15. Accordingly, when the direct coupling clutch D is inoperative, the pressure within the transmission oil passage 7 assuredly maintains the pressure piston 15 in its retracted position to provide a better disengagement between the friction plates 12 and 13.

A centrifugal valve F for controlling the supply and discharge of working oil relative to the oil pressure cylinder 14 is arranged in a boss portion of the turbine disc 5$t$ in the following manner.

Integrally fitted in a recessed housing 17 on one side of the boss portion of the turbine disc 5t is an annular valve body 18 of the centrifugal valve F, the inner peripheral surface of which sealingly engages the outer peripheral surface of the input shaft 2. The valve body 18 has a cylindrical valve port 19 as shown in FIG. 3, the valve port 19 accommodating therein a spool valve 20 and a spring 21 for biasing the inner end thereof. Pivotally supported at 22 on the valve body 18 for radial movement is a centrifugal weight 23 which has an operating arm 23a in abutting engagement with the spool valve 20 at its end extended from the valve port 19 so that the centrifugal weight 23 acts on the spool valve 20 against the biasing force of the spring 21.

An output port 24, a low pressure port 25 and a high pressure port 26 arranged on the opposite sides of the output port are open to the valve port 19 so that as the spool valve 20 is slidably moved inwardly or outwardly, the output port 24 comes into communication with the low pressure port 25 or high pressure port 26.

The output port 24 is connected with the oil pressure cylinder 14 of the direct coupling clutch D through an oil passage 27 formed in the turbine disc 5t; the high pressure port 26 is connected with an oil pressure cylinder 31 of the high speed clutch 4h described later in detail through a high pressure oil passage 28 passing through the center of the input shaft 2; and the low pressure port 25 is connected with an oil reservoir R through an annular low pressure oil passage 29 concentrically formed externally of the high pressure oil passage 28 in the input shaft 2. The adjacent oil passages 28 and 29 are separated by a partition pipe 30 fitted in the input shaft 2.

Figures 2, 2A:
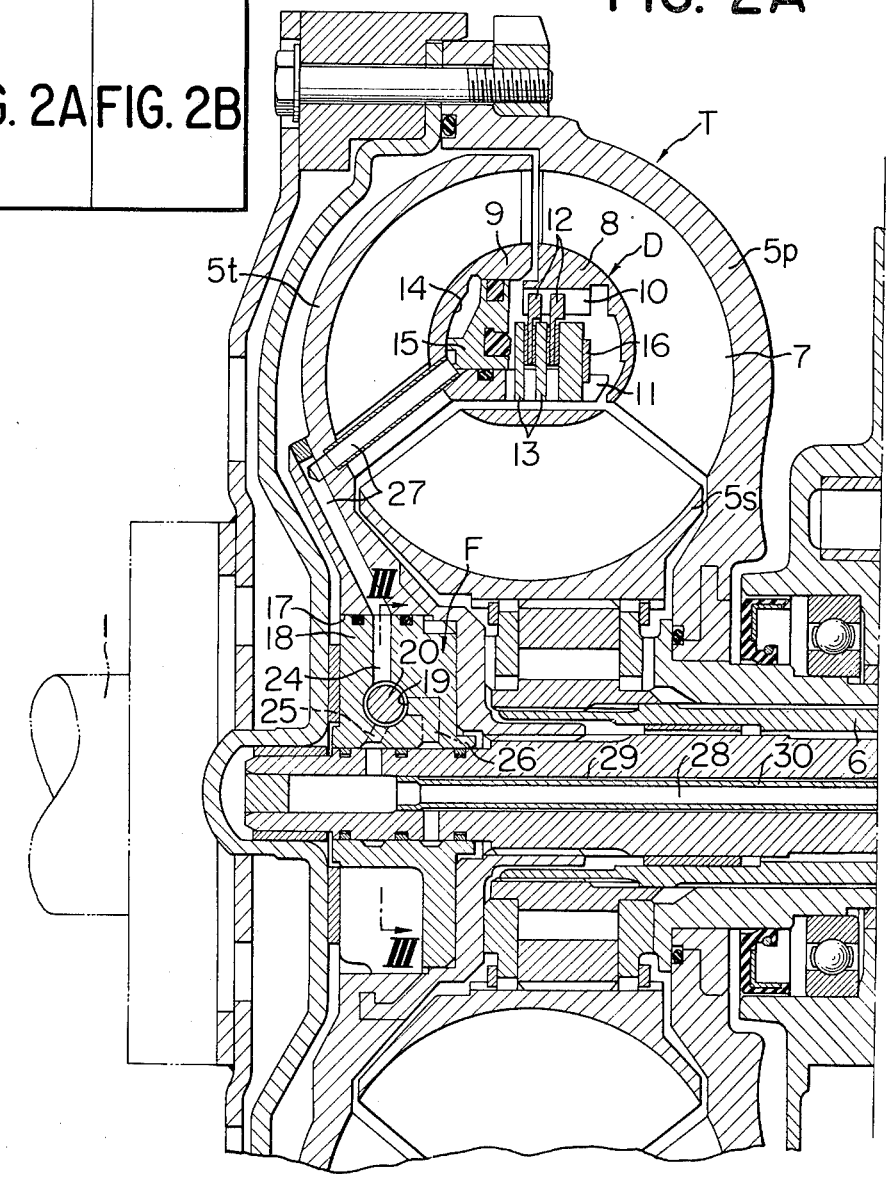
FIG. 2 is a view showing a combination of FIG. 2A and FIG. 2B.
FIG. 2A is an enlarged longitudinal sectional side view of one half of the torque converter and the high speed clutch with its associated parts as shown in FIG. 1.

As shown in detail in FIG. 2, the high speed clutch 4h has a clutch outer part 32, which is spline-connected to the input shaft 2 and provided at one side with an oil pressure cylinder 31, and a clutch inner part 33, which is concentrically arranged internally of the clutch outer part 32 and rotatably supported on the input shaft 2, the clutch outer part 32 and clutch inner part 33 having a plurality of driving friction plates 34 and a plurality of driven friction plates 35 slidably spline-engaged therewith, the plates 34, 35 being alternately superposed on each other. A pressure piston 36 opposing one side of the friction plates 34,35 is received in the oil pressure cylinder 31 while a pressure receiving ring 37 opposing the other end of the friction plates 34, 35 is locked to the clutch outer part 32. The clutch inner part 33 is integrally formed with a driving gear of the high speed geared device H. Thus, when pressure oil is fed into the oil pressure cylinder 31, the resulting pressure causes the pressure piston 36 to advance to place, in cooperation with the pressure receiving ring 37, the group of friction plates 34, 35 into frictional contacting engagement with each other, that is, the high speed clutch 4h may be brought into its operating state.

It should be noted that if the centrifugal valve F mounted on the boss portion of the turbine disc 5t and the high speed clutch 4h are both disposed on the input shaft 2 and the high pressure oil passage 28 for providing a connection therebetween is disposed in the input shaft2, it is possible to simply and easily form an oil passage leading from the high speed clutch 4h to the direct coupling clutch D.

Since the construction of the low speed clutch 4l is substantially similar to the above-mentioned high speed clutch 4h, the detailed description thereof is omitted.

In FIGS. 2A and 2b, reference character P designates an oil pressure source in the form of an oil pressure pump normally driven by the pump disc 5p of the torque converter T.

Next, the oil pressure circuit of the speed change gear will be described with reference to FIG. 4. In the oil passage 28 extended from an outlet of the oil pressure pump P are series-inserted a conventional manually operated valve M and a conventional shift valve S which receives two kinds of opposing control signals which are representative of the opening degree of a throttle valve of the engine and of the vehicle speed, respectively, and is operated to take a first position and a second position. Oil pressure cylinders of the low speed clutch 4l and high speed clutch 4h are connected to a low speed oil passage 39 and a high speed oil passage 40 both branched from the output side of the shift valve S. The oil pressure circuits in connection with the high speed clutch 4h, centrifugal valve F and direct coupling clutch D have already been explained with reference to FIG. 2.

The operation of the above-mentioned embodiment will now be explained. In FIGS. 2A and 2B, when the torque converter T is operated in a speed change region and the turbine disc 5t is rotated at a low speed, the centrifugal force acting on the centrifugal weight 23 rotating with the turbine disc 5t is small, and therefore, the spool valve 20 is held in an outward position under the resiliency of the spring 21 against the aforesaid centrifugal force so that the oil pressure cylinder 14 of the direct coupling clutch D is brought into communication with the low pressure oil passage 29, thus opening to the oil reservoir R. Accordingly, the direct coupling clutch D is maintained inoperative so as not to impair the speed changing action of the torque converter T.

When the torque converter T is operated to go beyond the speed change region into the clutch region where no torque increasing action takes place, as a consequence of which the rotational speed of the turbine disc 5t increases to a level in excess of a given value, the correspondingly increasing centrifugal force of the centrifugal weight 23 causes the spool valve 20 to be displaced inwardly against the action of the spring 21 so that the oil pressure cylinder 14 of the direct coupling clutch D is brought into communication with the high pressure oil passage 28 and thus with the oil pressure cylinder 31 of the high speed clutch 4h.

Figure 4:
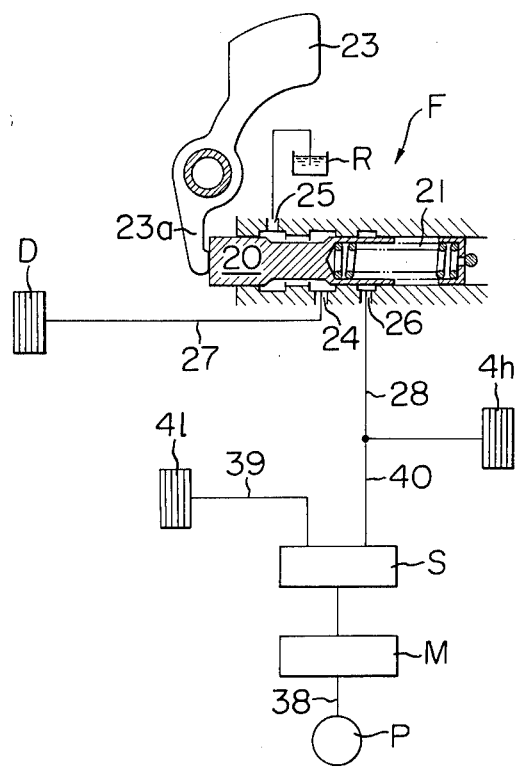
FIG. 4 is a diagrammatic illustration of the oil pressure circuit.

If, at this time, the low speed oil passage 39 is selected by the shift valve S in FIG. 4 to feed pressure oil from the oil pressure pump P to the low speed clutch 4l, that is, if the low speed geared device L is in operative state, a supply of pressure oil to the high speed clutch 4h is interrupted so that the direct coupling clutch D in communication therewith is not supplied with pressure oil and thus remains in its inoperative state. On the other hand, if the shift valve S is switched to select the high speed oil passage 40 to feed pressure oil to the high speed clutch 4h, that is, if the high speed geared device H assumes its operative state, pressure oil is supplied also to the oil pressure cylinder 14 of the direct coupling clutch D through the high pressure oil passage 28 and as a result, the pump disc 5p and turbine disc 5t may be connected mechanically by the operation of the clutch D.

According to the present invention, as described above, the hydraulically operated direct coupling clutch is interposed between the pump disc and turbine disc of the torque converter so that when the turbine disc reaches a rotation speed in excess of a given value, the centrifugal valve operatively connected therewith may act to apply working oil pressure to the aforesaid direct coupling clutch so as to directly couple both the discs. Accordingly, the slip loss between the aforesaid discs may be substantially eliminated in the clutch region where no speed changing action of the torque converter takes place, thereby improving the transmission efficiency and the consumption rate of fuel.

In further accordance with the invention, particularly in case of the provision of at least two-stage (high and low) speed change geared devices adapted to be selectively operated by the shift valve, the high pressure oil passage connected with the centrifugal valve is placed into communication with the oil pressure cylinder of the hydraulically operated means of the high speed geared device so that even if the rotational speed of the turbine disc reaches the aforementioned given value, the aforementioned direct coupling clutch is not brought into operation unless the high speed geared device is operated. Accordingly, particularly when the low speed geared device is operated during the acceleration of the vehicle, the torque increasing action of the torque converter may be sufficiently utilized to obtain the desired accelerating performance, and further, at time of the shifting down during high speed running, the direct coupling clutch may be immediately released to induce the torque converter to give rise to an adequate rate of slip, and as a result, it is possible to avoid inconveniences such as generation of a dangerous excessive deceleration of the vehicle or excess speed of the engine.

Furthermore, as the spool valve 20 is arranged in the valve port which extends in a direction at right angles to the diametral direction of the input shaft 2 as shown in FIG. 2A, entry of dust into the clearance between the spool valve and the valve port can be prevented to ensure the proper operation of the spool valve. In addition, with the arrangement that the spool valve is also arranged at right angles to the axial direction of the input shaft, increase of the axial length of the torque converter even with the provision of the centrifugal valve is avoided and the centrifugal valve of the invention can be incorporated in the torque converter without any difficulty in arrangement of other components. Moreover, since the centrifugal weight is formed separately from the spool valve the centrifugal action of the weight can be increased by utilization of the lever ratio of the centrifugal weight, as a consequence of which the timing in opening of the centrifugal valve can be determined accurately in cooperation with the fact that the setting force of the biasing spring can be increased.

What is claimed is:

1. A control device for a torque converter in an automatic speed change gear for a vehicle, said automatic speed change gear having an input shaft connected to a driving shaft of an engine of the vehicle through a torque converter, said torque converter having a pump disc associated with said driving shaft and a turbine disc associated with said input shaft, said input shaft being connected to an output shaft through at least a two-stage gearing including a low speed geared device and high speed geared device, said low speed and high speed geared devices having respective hydraulically operated means including oil pressure cylinders, and an oil pressure source, said control device comprising a shift valve disposed between the oil pressure cylinders of said hydraulically operated means and said oil pressure source for selectively connecting the oil pressure source with one of said oil pressure cylinders, a hydraulically operated direct coupling clutch disposed between said pump disc and said turbine disc for directly coupling said pump disc and turbine disc, said direct coupling clutch including an oil pressure cylinder, a high pressure oil passage connected to said oil pressure cylinder of said direct coupling clutch and to the oil pressure cylinder of said hydraulically operated means of said high speed geared device, a low pressure oil passage connected to said oil pressure cylinder of said direct coupling clutch and to an oil reservoir, and centrifugal valve means operatively connected to said turbine disc for placing said oil pressure cylinder of said direct clutch in communication with said low pressure oil passage at the time of low speed rotation of said turbine disc and with said high pressure oil passage at the time of high speed rotation of said turbine disc, said oil pressure cylinder of said direct coupling clutch being formed in one of two opposed annular inner peripheral walls of said pump disc and said turbine disc, said walls defining therebetween a transmission oil passage, said direct coupling clutch further comprising a clutch-operating pressure piston in said oil pressure cylinder so that oil pressure in said transmission oil passage acts on one surface of said pressure piston to bias said piston and avoid the use of a biasing spring, said oil pressure operated means of said high speed geared device comprising a hydraulically operated clutch mounted on said input shaft, said centrifugal valve means comprising an annular valve body fitted between said turbine disc and said input shaft, and an oil passage in said input shaft connecting said centrifugal valve means and said hydraulically operated clutch.

2. A control device for a torque converter in an automatic speed change gear for vehicles according to claim 1, wherein said valve body of the centrifugal valve means integrally rotates with said turbine disc, a valve port being provided in said valve body and extending at right angles to the axial and diametral directions of said input shaft, a spool valve slidably fitted in said valve port, biasing means for biasing said spool valve in one axial direction of said valve port, a centrifugal weight pivotally supported on said valve body at a location spaced radially from the axis of said input shaft, said centrifugal weight having an operating arm in abutting engagement with said spool valve for displacing said spool valve in the opposite axial direction of said valve port against the force of said biasing means.

* * * * *